Dec. 16, 1930.　　　C. SCHROEDER ET AL　　　1,785,394
BATTER FEEDING DEVICE FOR PASTRY CAKE MACHINES
Filed Jan. 3, 1928　　　3 Sheets-Sheet 1

INVENTOR.
Charles Schroeder
and
Harry Tatosian.
ATTORNEYS.
Chamberlain & Newman

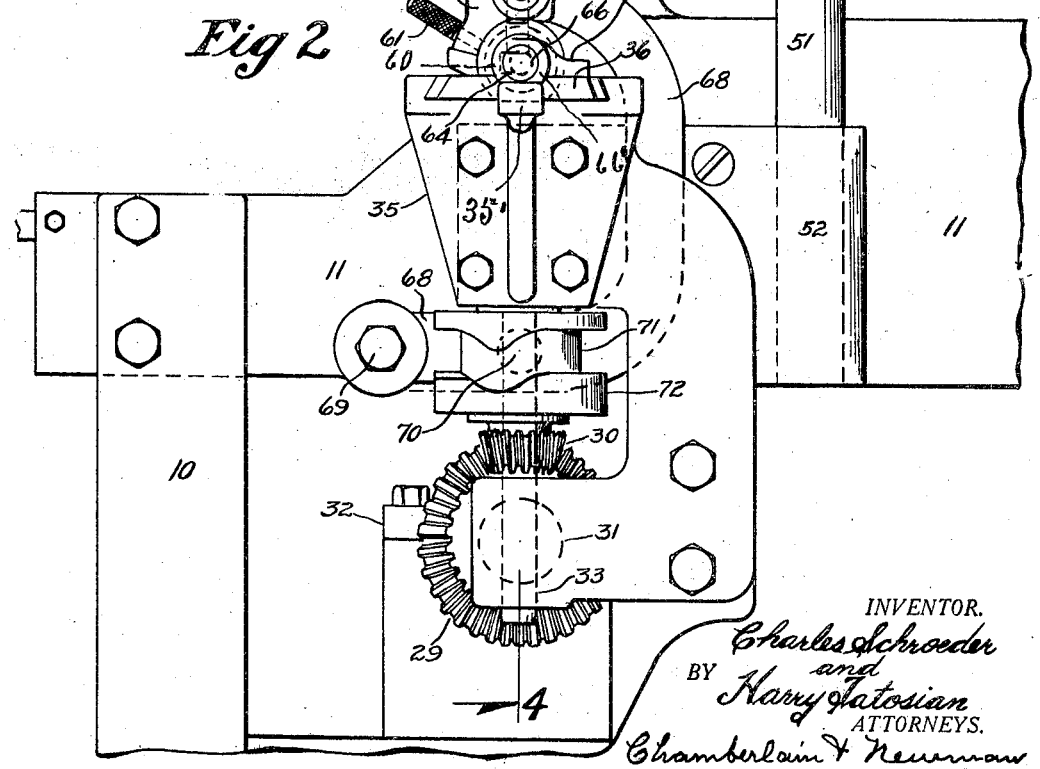

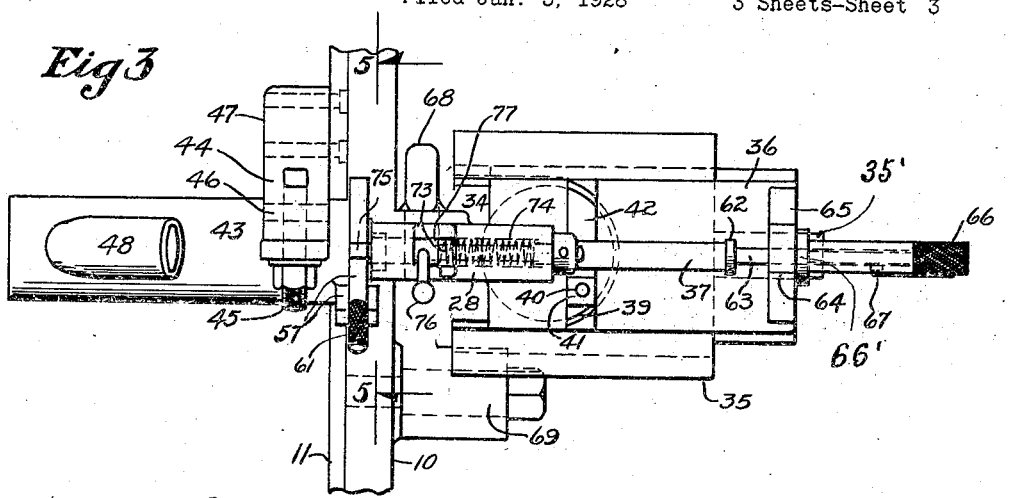
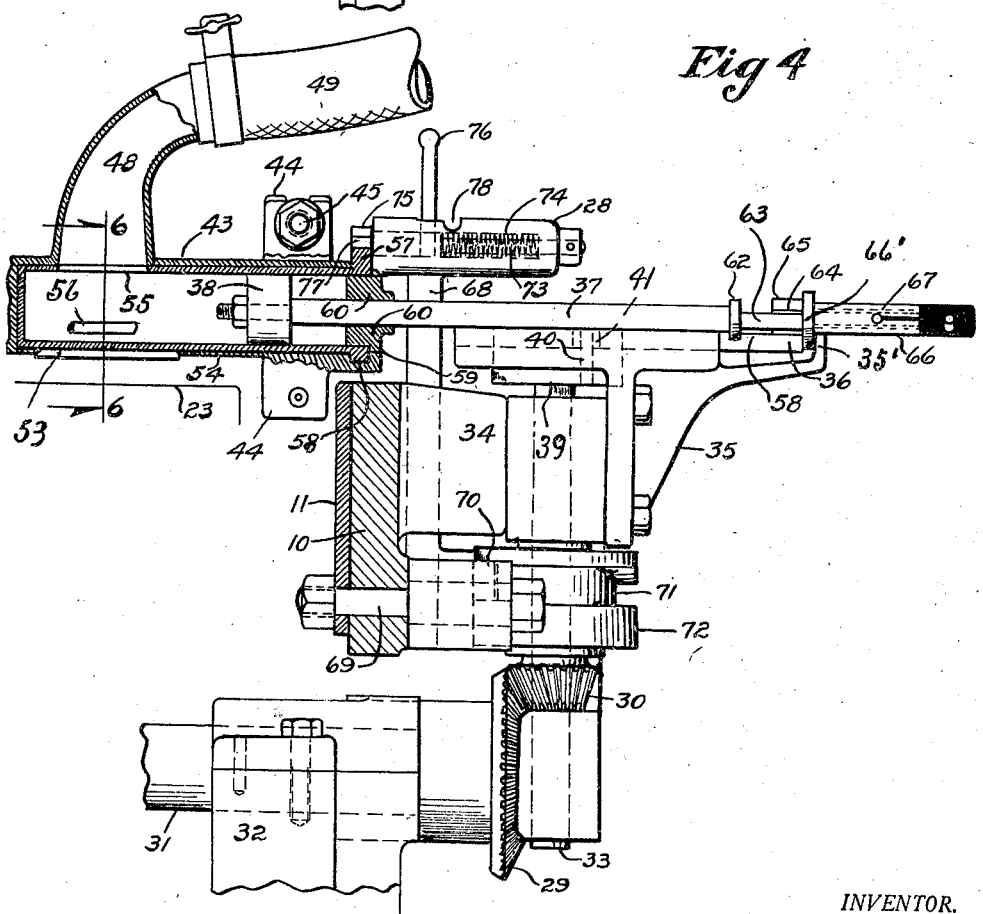

Patented Dec. 16, 1930

1,785,394

UNITED STATES PATENT OFFICE

CHARLES SCHROEDER AND HARRY TATOSIAN, OF BRIDGEPORT, CONNECTICUT, ASSIGNORS TO ICE CREAM CONE MACHINERY INC., OF BRIDGEPORT, CONNECTICUT, A CORPORATION OF CONNECTICUT

BATTER-FEEDING DEVICE FOR PASTRY-CAKE MACHINES

Application filed January 3, 1928. Serial No. 244,164.

This invention relates to new and useful improvements in ice cream cone machines and more particularly to improvements in machines for making pastry cakes from which ice cream cones may be rolled immediately after being baked.

The invention is shown applied to a chain type of cake baking machine such for instance as is shown in our previous Patent No. 1,540,041 dated June 2, 1925, though it is equally applicable to the rotary table type of cake baking machine. The invention further relates to a batter feeding apparatus, sometimes called a pump, and whereby given quantities of batter, from which the cakes are baked are automatically deposited upon the successive baking irons as they are fed forward toward the heating areas.

A further and important object of the invention is to provide a batter feeding unit or pump wherein the cylindrical compression cylinder is rotatably mounted within a cylindrical casing and is provided with operating connections through one end of the casing in a manner to avoid openings through the sides of the casing, through which the batter may leak out. Further to provide means whereby the pump can be quickly removed and disassembled for washing, cleaning or repairing and whereby the required amount of batter may be uniformly measured and discharged upon the baking irons.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit, or sacrificing any of the advantages of the invention.

Similar characters of reference denote like or corresponding parts throughout the several figures of the accompanying drawing forming a part of this specification and upon which Fig. 1 shows a side elevation of one end portion of a chain type of cone cake baking machine having our improved batter feeding unit applied thereon;

Fig. 2 shows an enlarged side elevation of the batter feeding unit shown in Fig. 1;

Fig. 3 is a plan view of the batter unit shown in Fig. 2;

Fig. 4 is a central vertical sectional view taken on line 4—4 of Fig. 2;

Fig. 5 shows an enlarged sectional elevation taken on line 5 of Fig. 3.

Fig. 6 is a somewhat similar cross section taken on line 6—6 of Fig. 4, through the cylindrical batter feeding means.

Figure 1:
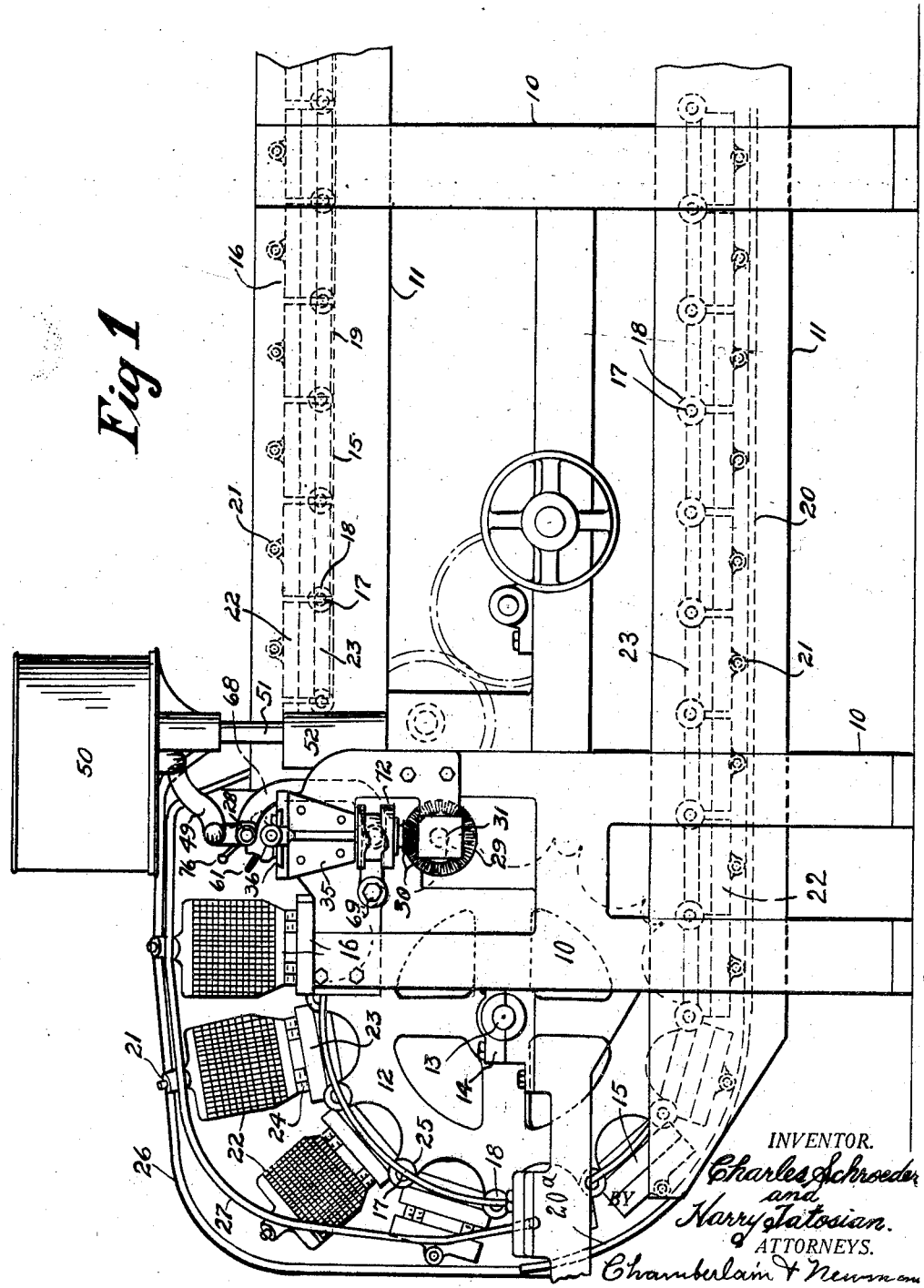

Referring in detail to the characters of reference marked upon the drawings and more particularly Fig. 1, wherein is shown a side elevation of a machine provided with one of our batter feeding units, 10 and 11 represent vertical and horizontal side frame portions of a cone cake baking machine. 12 shows a double sprocket wheel mounted upon a cross shaft 13 journalled in bearings 14 and mounted on the horizontal frame members 11. This sprocket may be driven through gear connections from any suitable source, such as an electric motor, not shown.

The drawings show but one end portion of a relatively long cone cake baking machine carrying two endless chains 15, of like construction, of baking units 16, which are in part mounted upon and operated by sprocket wheels 12 carried in opposite end portions of the machine frame. The baking units are connected together to form an endless chain, by cross rods 17, each carrying a roll 18 upon its opposite end portions, to ride upon a longitudinal track 19, on the inside of the upper horizontal frame members 11.

I also provide a lower longitudinally disposed track section 20 upon the inner side of the horizontal frame members 11 and upon which rolls 21 on outer baking plate member 22 ride for the support of the chain baking units, while in a closed position and during their travel through the lower heated area of the machine. The forward end portion 20ª of this track 20 is curved up and around forming a part of a circle which conforms to the travel of the chain of baking units around the sprocket and so as to support and hold the hinged members 22 and 23 comprising the units, in closed positions. The upper and lower baking plates are hingedly connected together as at 24, and serve to allow the outer plate to be raised and lowered with respect to the inner plate. The end portions of the rods 17 become engaged and seated in the pockets 25 formed in the outer extremities of the sprockets 12 during the travel of the baking units from the lower to the upper plane. As the chain of baking units travel upward and around the sprocket, the rolls 21 leave the inner face of the curved track 20ª and run in between the lower end of the guide rods 26 and 27, which are of different shape and serve to lift the outer baking plates from the lower ones, leaving the baked cake thereon free to be removed by an attendant, who in practice takes them, in their hot flexible state, and quickly feeds them into a rolling machine which rolls them into cones.

These baking units come forward very rapidly, sufficient to keep an attendant busy. As the cakes are removed from the lower plates of the units, they pass on under the batter feeding element where a given quantity of batter is automatically and quickly deposited thereon. During the continued travel of the baking unit the outer plate is lowered upon the batter in a manner to spread the same to the desired size and thickness and to hold it therebetween during their travel through the upper and lower heated baking areas.

The machine thus briefly described is one manufactured by us, and thus chosen as an illustration upon which to show our novel batter feeding means, and obviously forms no part of the invention, since as before suggested the invention is equally applicable to most all types of cake and cone baking machines.

In Figs. 2, 3 and 4, we have shown our batter feeding means as attached to the frame portions 10 and 11 of the machine above described, and in this connection we have also provided means such as bevel gear connections 29 and 30 for operating the batter feed from a driven shaft 31 journalled in a bearing 32 of the machine. The smaller bevel gear 30 is secured upon a vertical shaft 33 mounted to turn in a bracket 34 bolted to the upper side member 11 of the frame. A second bracket 35 is bolted to the before mentioned bracket 34 and serves to support a reciprocatory slide 36 that is seated in dovetail ways in the top side of the bracket 35 and through which slide the piston rod and piston of the feeding device are reciprocated. This reciprocatory movement of the slide, piston rod 37 and piston 38, is effected through an eccentric 39 mounted upon the before mentioned shaft 33 and including a pin 40 carried by the member 39. The upper end of this pin engages a slide block 41 mounted for cross reciprocation in a slot 42 of the before mentioned slide 36.

The pump proper comprises a cylindrical casing 43 having oppositely disposed ears 44 for its detachable connection to parts of the machine frame, one of said ears being provided with a slot to receive a screw 45 that is hingedly connected as at 46 to a fixed part 47. This screw is provided with a nut whereby upon loosening the nut, the screw can be lifted out of the slot, leaving the casing free to be removed. The cylindrical casing 43 is provided with an inlet pipe 48 which may be connected by a flexible pipe 49 to a batter reservoir 50 of any suitable style and which in the present instance is shown supported upon a post 51 secured in a suitable socket 52 attached to the side of the upper frame member 11.

This cylindrical casing 43 is further provided in its under side with a discharge opening 53 located immediately above the path of travel of the lower baking irons 22, and whereby the batter when fed from the pump is deposited on the top side of the said irons. The feeding device further includes an inner rocker cylinder 54 mounted within the cylindrical casing 43 and is provided with a top opening 55 and a lower opening 56, the former of which is positioned to be brought into register with the inlet 48 and the latter positioned to register with the lower discharge opening 53, by a rocker motion of the said inner cylinder produced by mechanism again to be referred to. This cylinder projects from the open end of the casing and includes upon its exposed end, a flange 57, with which operating connections are made for the rocking of the cylinder to open and close the same in the batter feeding operations. This avoids the formation of joints between the cylinder and casing, forward of the piston, through which batter may ooze out. A reduced portion 58 of the flange is fitted in a short circular groove 59 of the casing, see Fig. 4, which serves to hold the cylinder in position. This end of the cylinder may be provided with a plug 60, which can be secured therein by any suitable means, such as a set screw 61.

The piston 38 mounted on the piston rod 37 is adapted to be reciprocated backward and forward within the piston cylinder 54 by the slide and eccentric connections before mentioned. In this respect it will be noted that the outer end portion of the piston rod is provided with a collar 62, and adjacent thereto is provided a reduced bearing portion 63 that reciprocates in a pocket 64 of a bracket 65 carried upon the outer end portion of the slide 36. A handle 66 is threadably attached to the outer threaded end portion of the piston rod and includes an enlarged inner end 66' for engagement with a stop 35' which limits the outward movement of the piston rod and length of the stroke of the piston. This handle is adapted to be adjusted on the piston rod to lengthen and shorten its stroke and whereby the amount of lost motion of the piston is varied and different quantities of batter fed to the baking irons.

A spring actuated pin device 67 is provided in the handle to engage the threaded end portion of the piston rod for the purpose of holding the handle thereon in its adjusted position. This handle also serves to facilitate the removal of the rod, piston and cylinder, if desired, and which removal is best accomplished by first withdrawing the end of the closure plug 60 and then shifting the outer end of the rod 37 sidewise, out from the pocket 63.

The cylinder, as before suggested, is provided with a rocker motion whereby its outlet is successively brought to register with the discharge opening 53 of the outer cylinder for the purpose of releasing uniform quantities of liquid batter. In this connection it will be understood that the piston is operated simultaneously with this opening rocker movement, that is to say it is shoved in at this time in a way to force the batter out through the lower opening, since at this moment the inlet is closed. As the batter feeding means is operated through direct connections with the baking machine, proper timing of the feeding operations with respect to the movement of the baking units, is assured.

The operation of rocking the cylinder is accomplished through a curved arm 68, the lower end of which is mounted upon a fixed stud 69. A roller 70 is carried upon the lower portion of this arm for engagement with a cam groove 71 of a cam 72 mounted upon the before mentioned vertical shaft 33 journaled in the bracket 34. The pitch of this cam groove is such as to impart a backward and forward swinging movement to the upper free end portion of the arm. This upper end portion of the arm is provided with a spring actuated pin 73 which is mounted therein and has its end portion normally projected forward by the action of its spring 74 for engagement with the notch 75 in the flange 57 formed on the outer end of the cylinder 54.

A small handle 76 is secured to the pin 73 and projects outward through an opening 77 formed in the top end portion of the arm and serves as a means for withdrawing the pin from its seat 75 and retaining it out of engagement with the notch of the flange, by slightly turning the pin so that the said handle will engage and rest in the notch 78 formed in the side wall of the said notch. The purpose of this simple means of disconnecting the operative connection is to permit, if desired, the machine to be run empty and without feeding batter to the baking units, which idle operation is obviously desirable at times, as for instance when first starting the machine up and during the period of heating up the baking units.

The batter feeding device herein described, when applied to a baking machine, would obviously be connected with the operating mechanism thereof, and timed so that the batter feeding operations would be performed promptly with the positioning of the baking irons beneath the batter feeding device. The several operative features, of the feeding device, are connected to be operated from the shaft 33 before mentioned and which in turn is connected to be driven by a shaft 31 of a baking machine. The feed includes two lines of operative connections, one to impart a rocker movement to the cylinder whereby the inlet and outlet thereof are opened and closed to receive and discharge given quantities of batter, and the other, means for reciprocating the piston within the cylinder whereby the feeding of the batter contained within the head portion of the cylinder is forced out therefrom at a time when the inlet is closed and the outlet is opened. This reciprocatory movement is as before explained, accomplished through the eccentric and slide connection and is limited by the stop 65 against which the collar and handle strike in the reciprocation of the piston.

Having thus described our invention, what we claim and desire to secure by Letters Patent is:

1. In a batter feeding device, a casing having inlet and outlet openings, a rocker cylinder in the casing and having an inlet and an outlet, a piston within the cylinder, a driven shaft, means on the shaft for reciprocating the piston, a cam on the shaft, means rocked by the shaft, a retractable spring, pressed pin connecting said means with the cylinder whereby the cylinder will rock with the means, and means to retract the pin and secure it in inoperative position whereby the cylinder will not be moved by said means.

2. In a batter feeding device, the combination with a casing having batter inlet and outlets, a rocker cylinder mounted in the casing and also having batter inlet and outlet to register with those of the casing, and having a radially extended flange upon its exposed end portion with a notch therein, a piston within the cylinder, means for reciprocating the piston, a rocker arm, a spring actuated pin carried by the rocker arm for detachable engagement with the notch of the flange, and means for operating the rocker shaft.

Signed at Bridgeport in the county of Fairfield and State of Connecticut this 30th day of Dec., A. D. 1927.

CHARLES SCHROEDER.
HARRY TATOSIAN.